United States Patent
Picardat

[11] 3,851,304
[45] Nov. 26, 1974

[54] AIRCRAFT FLIGHT DATA DISPLAY INSTRUMENT

[75] Inventor: Bernard Picardat, Paris, France
[73] Assignee: Thomson-CSF, Paris, France
[22] Filed: Apr. 24, 1973
[21] Appl. No.: 354,126

[30] Foreign Application Priority Data
Apr. 28, 1972 France .................. 72.15391

[52] U.S. Cl. .................................. 340/27 NA
[51] Int. Cl. .................................. G08g 5/02
[58] Field of Search .. 340/25, 27 R, 27 AT, 27 NA; 35/12 B, 12 N

[56] References Cited
UNITED STATES PATENTS

| | | | |
|---|---|---|---|
| 3,569,926 | 3/1971 | Korn et al. | 340/27 NA |
| 3,593,259 | 7/1971 | Stormo | 340/27 NA |
| 3,593,260 | 7/1971 | Stormo | 340/27 NA |
| 3,648,232 | 3/1972 | White | 340/27 R |
| 3,693,143 | 9/1972 | Kennedy | 340/27 NA |

Primary Examiner—Kathleen H. Claffy
Assistant Examiner—Randall P. Myers
Attorney, Agent, or Firm—Cushman, Darby & Cushman

[57] ABSTRACT

A display instrument for projecting aircraft flight data upon a transparent screen into the pilot's normal line of sight, wherein an optical objective projects images of luminous objects focused at infinity onto a combining glass; the luminous objects which represent the flight data to be displayed being carried out by means of electro-optical transducers such as electroluminescent diodes supplied by an associated supply circuit; servo means responsive to output signals of airborne sensor devices controlling the displacement of, and the selective supply to, the diodes representative of variable flight data.

2 Claims, 3 Drawing Figures

AIRCRAFT FLIGHT DATA DISPLAY INSTRUMENT

The present invention relates to an aircraft flight data display instrument intended to project flight data upon a transparent screen in the pilot's line of sight.

An optical collimator enables an image of a luminous object to be projected at infinity. To this end, the luminous object is positioned in a focal plane of an optical objective which converts into parallel rays the emitted omnidirectional radiation. The image of the luminous object focused at infinity is projected onto the reflective surface of a transparent combining glass. The combining glass is positioned so that the image reflected is projected into the line of sight of the observer. The pilot therefore sees the image of the luminous object superimposed on the landscape or sky background.

Such collimating devices are particularly used as pilot aid apparatus on board aircraft. They are known as a "collimating head" in a "Head-up Display System." The luminous objects, displayed in the form of marks or symbols, represents determined flight data which may relate, for example, to the flight parameters necessary for ground approach during a landing phase. Many advantages are provided with such a display device. In particular, the symbols can be displayed in a complex fashion, being distinguished by shape and colour; the representation is both very fine and on a large scale; and they can be seen without eye accommodation for distance or luminosity.

It is necessary that the image stands out distinctly from the visual background, which may be extremely bright. Consequently, the object situated in the focal plane must be of high luminosity.

In a collimating head, the display of required flight data is made according to known techniques by means of back-lighted reticles which form the luminous objects in the focal plane of the optical objective. A reticle may be constituted by an opaque tape with transparent areas. The aircraft is provided with detecting devices (sensors, gyroscope system and so on) to measure the flight data. The detected signals feed control means such as servo-systems for the positioning of corresponding reticles. The light source associated with reticles, for example an iodine lamp, must be of a high power owing to the light losses on the opaque parts of the reticles. The dissipated power is important and furthermore, it results in the equipment heating up to a not inconsiderable degree.

One object of the invention is to provide a collimating device which remedies the drawbacks aforementioned.

According to the invention, there is provided a display instrument for projecting aircraft flight data into the pilot's normal line of sight, comprising a transparent combining glass positioned in the said line of sight and having a surface for reflecting projected images into the said line of sight, an optical objective for projecting images of luminous objects focused at infinity onto the said surface, and means comprising a supply circuit for generating said luminous objects corresponding respectively to the flight data to display, wherein said means comprises electro-optical transducer elements supplied by said circuit and having light emitting areas arranged in the focal zone of said optical objective.

Other and further objects and features of the invention will be more apparent to those skilled in the art upon a consideration of the following description and accompanying drawings wherein is disclosed a single exemplary embodiment of the invention with the understanding that changes and modifications may be made therein as fall within the scope of the appended claims without departing from the spirit of the invention. In said drawings:

Figure 3:
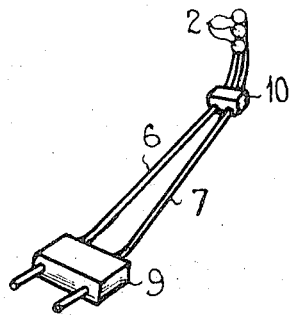

FIG. 3 schematically illustrates the embodiment of the reticle and its support.

A collimating head according to the invention uses electroluminescent diodes to form fixed or moving collimated images.

To this end, the emissive area of the diodes is positioned, or substantially positioned, in the focal zone of the optical objective of the collimating head. The small surface area of the emissive part of a solid diode enables a luminous point-source to be formed without difficulty, which, after collimation, gives an image of sufficiently small angular size which is compatible with collimated representation. The formation of a mark or symbol which is not a point is achieved using a plurality of suitably arranged diodes. For example, a line is formed by a linear array of point diodes, or by means of one or more diodes with an emissive surface which is elongated in the form of a bar. A plurality of systems of grouped diodes may be used in the same collimator to display different information in the form of a plurality of symbols.

Reticles produced in this way are extremely compact, light in weight, and highly reliable. Furthermore, the power required is low as a result of satisfactory power efficiency of the diodes; life is extremely long and may be some tens of thousands of hours; the supply voltages required are low and are compatible with those of TTL logic circuits which can be used to form supply circuits and, possibly, to control the diodes.

Figure 1:
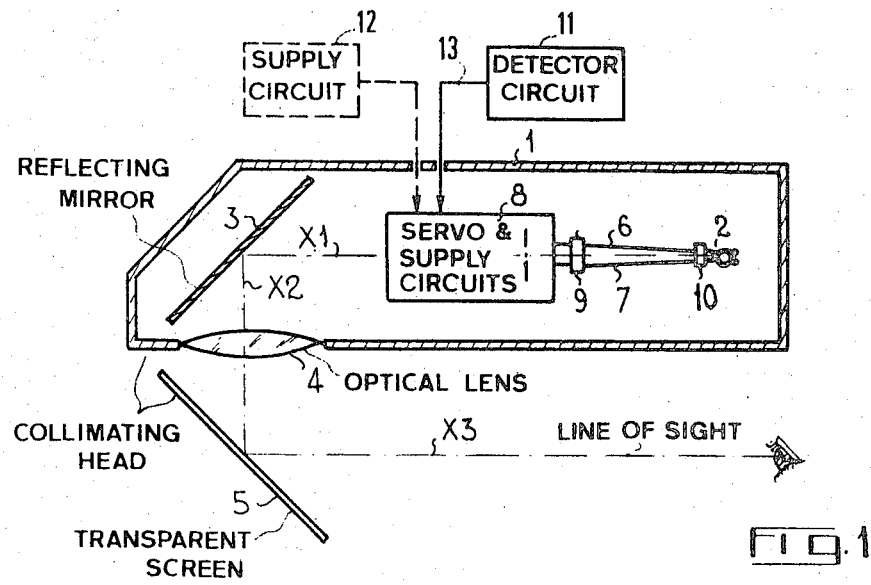
FIG. 1 shows schematically a cross-section of a collimating head according to the invention.
Figure 2:
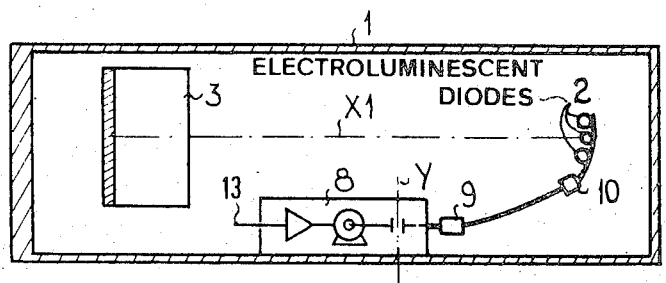
FIG. 2 shows the same collimating head seen in a cross-section at right-angles to that in FIG. 1.

FIGS. 1 to 3 relate to an embodiment of a collimating device according to the invention which may be applied to air navigation as a flight display instrument.

The FIGS. 1 and 2 correspond respectively to perpendicular cross-sections taken along the optical longitudinal axis X1 shown. An assembly held in position in a housing 1 comprises: a plurality of electroluminescent diodes at 2, which are restricted to three in this example, a flat reflecting mirror 3 inclined at 45° to the optical axis X1, and an optical lens 4 formed by a biconvex lens. On the outside of the housing, a semi-transparent screen or combining glass 5, which may be steerable, enables to optical axis X2 of the optical lens 4 to be swung onto the line of sight X3 of the pilot. The reflecting mirror 3 is intended to provide the lontitudinal size of the housing in the direction X1 at right angles to X2, and so as to produce a piece of equipment of small bulk as regards its height measured along X2.

The support for the diodes 2 is shown in greater detail in FIG. 3. It is made up of an arm formed by two hollow conductive tubes 6–7, one end of which is mechanically connected to the shaft of a drive member controlled by a servo-circuit shown diagrammatically at 8; it is considered that a rotation takes place about an axis Y at right angles to X1. The drive-shaft Y is connected mechanically while maintaining the electric insulation of the two conductors 6-7 through which the supply currents to the diodes 2 is transmitted. The latter are electrically connected by their respective terminals to the conductors 6-7, either by soldering to the end parts of the conductors, or by means of a pre-wired diode support. Insulating members 9-10 enable the movable arm to be held mechanically firm.

The diodes are arranged taking into account the curvature of the focal zone; then the optical objective may be a simple bi-convex lens. When angular rotation about the axis Y takes place, the diodes describe a segment of a sphere which approximates closely to the focal zone of the lens. The movement is servo-controlled in relation to the instantaneous value of the parameters to be displayed such as the inclination, course, etc..., of the aircraft. The servo-circuit is fed by output signals at 13 of a corresponding detector device 11.

While only the one servo-motor and diode reticle arrangement required for displaying a single flight parameter is illustrated in FIG. 2, it should be understood that the number of servo-motor and diode reticle arrangements may be large to enable a plurality of separate parameters to be displayed and they may be selectively supplied with current as a function of the one or more parameters to be displayed at the time in question. The control of supply may be carried out automatically or semi-automatically by means of servo-circuits. A voltage source for supplying the diodes may be external at 12 and common to other aircraft circuits or, located at 8 with the servo-circuits into the housing 1 of the collimating head.

What is claimed is:

1. A display instrument for projecting aircraft flight data into the pilot's normal line of sight, said instrument comprising:
    a transparent combining glass positioned in the said line of sight and having a surface for reflecting projected images into the said line of sight;
    a housing fixed with respect to the aircraft;
    an optical objective supported by said housing for projecting images of luminous objects focused at infinity onto the said surface;
    a plurality of light emitting elements mounted in said housing and having respective areas for providing light by conversion of electrical power applied thereto, said elements being arranged to serve as said luminous objects and to represent flight data as a function of the positioning of the elements;
    a supply circuit for supplying electrical power to said light emitting elements;
    means for supporting said light emitting elements;
    servo control means responsive to signals corresponding to flight data measurements for actuating said supporting means to position said areas of the light emitting elements within the focal zone of the optical objective; and
    detector means connected to said servo control means for measuring flight data and developing said signals.

2. A display instrument as set forth in claim 1, wherein said elements are electroluminescent diodes.

* * * * *